June 21, 1927.
F. WILLIAMSON ET AL
AUTOMOBILE BUMPER
Filed May 5, 1924
1,633,054
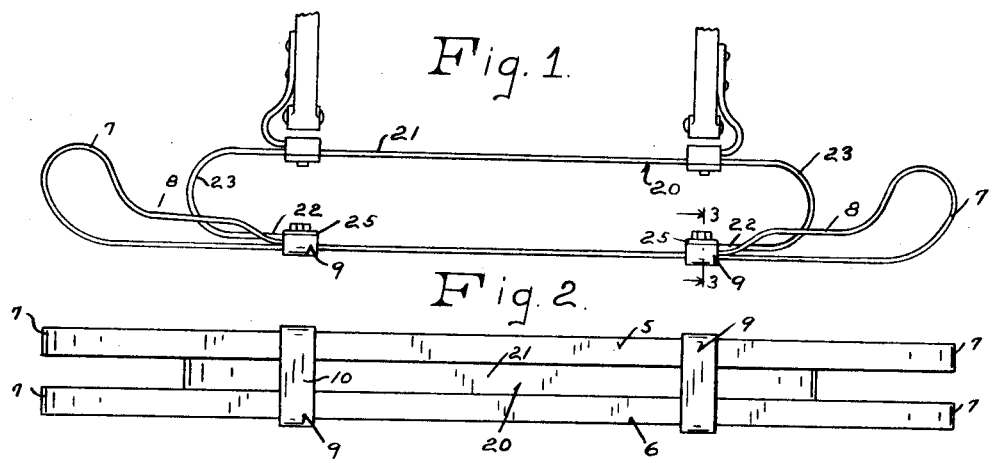
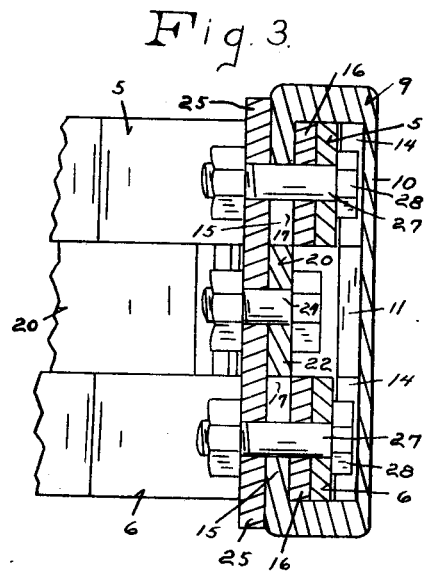
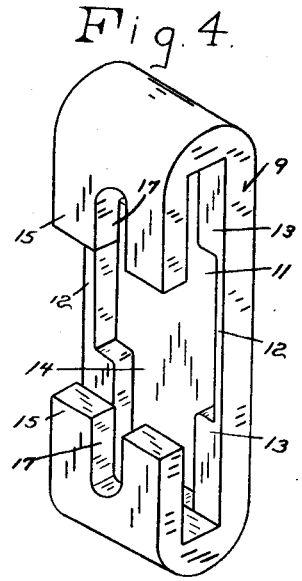
Paul P. Runnels INVENTOR.
Fred Williamson
Erwin, Wheeler & Holard
ATTORNEYS.

Patented June 21, 1927.

1,633,054

UNITED STATES PATENT OFFICE.

FRED WILLIAMSON, OF CHICAGO, ILLINOIS, AND PAUL P. RUNNELS, OF INDIANAPOLIS, INDIANA; SAID RUNNELS ASSIGNOR TO OSCAR E. STOKES, OF STREATOR, ILLINOIS.

AUTOMOBILE BUMPER.

Application filed May 5, 1924. Serial No. 711,126.

This invention relates to improvements in automobile bumpers.

Bumpers are subject to substantially continuous vibration when in use, and are also subject to occasional heavy shocks. It is the problem in this art to provide bumper mountings and bumpers which will withstand the continuous vibration and shocks without having their several parts become disassociated. It is one of the primary objects of this invention to provide a novel and improved bumper involving a plurality of parts in a peculiarly substantial relationship. It is a further object of this invention to provide a sturdy bumper having a minimum number of parts for accomplishing the desired results. By utilizing a comparatively small number of parts to accomplish our purposes, we contribute to the inherent strength and rigidity of the bumper as well as to its ability to withstand vibration without disintegration.

It is a further very important object of this invention to provide a bumper structure including a number of transversely extending bars, the ends of each of such bars being folded back and interconnected in a manner adapted to combine strength with resiliency. We provide a special retaining clip or fitting for keeping the ends of the several bars concealed and in their proper relative position. This clip or fitting is so designed as to support the parts from each other with a comparatively slight reliance upon the bolts which are used to hold the parts together. In this way the strain on the bolts is minimized and the bumper is strengthened as well as reenforced against the effects of vibration.

It is also our object to secure together the several parts of our improved bumper with bolts which are readily accessible and which are, nevertheless, in such inconspicuous locations that they will not readily be visible and will not detract from the uniformly smooth exterior appearance of an article embodying this invention. In working out this purpose we have arranged our clip or fitting in such a manner that it receives and holds the heads of the securing bolts interiorly of itself, so that only the extremities of such bolts and the retaining nuts are visible. The retaining nuts are located within the bumper in such a manner that they are not visible from the front thereof nor directly from the side, but are nevertheless very accessible so that they may readily be tightened upon occasion or loosened for the removal or separation of the parts.

A further object of this invention relates to the provision of a bumper structure which will attain the various advantages above specified and will nevertheless be easy and simple to assemble so that the several parts may be preliminarily bent to form and may readily be inserted in the retaining clips without further bending or strains.

In the drawings:

Figure 1 is a plan view of our improved bumper structure.

Figure 2 is a front elevation thereof.

Figure 3 is a section taken on line 3—3 of Figure 1.

Figure 4 is a detail view in perspective of the improved clip which is preferably used in assembling the other parts of the bumper.

Like parts are identified by the same reference characters throughout the several views.

The bumper is of the double bar type and includes buffer bars 5 and 6. These bars are preferably identical in their shape and construction so that manufacturing costs will be kept lower than would be the case if bars of differing construction were used. For reasons which will hereinafter be made clear, the bars 5 and 6 are preferably spaced apart by a distance corresponding substantially exactly to their own vertical height.

Each of the bars 5 and 6 extends in a straight line throughout its intermediate portion and is bent back upon itself at each of its ends to provide the rounded loops 7. These loops are so formed as to be elongated at a rear angle, as is best shown in Figure 1. The extreme end portions of each bar are led from the loop in substantial parallelism with the straight intermediate bar portion or spaced therefrom as at 8, and are thence tied inwardly by the clips or retaining devices 9 in actual contact with the intermediate bar portion. This construction is such as to give strength as well as resiliency to the loops. The fact that the end of each bar is held to an intermediate portion thereof amounts, in effect, to doubling the thickness of the end portions of the bar and thereby to double the strength of such portions. At the same time, the fact that the bar does not extend in a straight line from the extremity of the loop to the clip 9 makes it possible for forces exerted upon the bar to act with moment thereon, whereby the resilient yielding characteristic of the device is enhanced.

The clip or retaining device 9 which has been referred to above is preferably of the peculiar form best illustrated in Figure 4. It is provided with an exteriorly flat front 10 having an interior cavity 11 formed by the reenforcing flanges 12. The thickness or width of these flanges is increased at 13 toward the top and bottom of the clip 9 whereby to reduce at these points the transverse extent of cavity 11. The reduced portions of such cavity are designated in the drawings by the reference character 14 and serve to secure against rotation the bolt heads which are used to fasten the parts of the bumper together.

Opposite to each of the slot portions 14 of cavity 11 is a centrally extending arm 15 which is preferably integrally connected to the adjacent end of the front 10 of the clip. The arms 15 terminate at spaced points which are just sufficiently far apart to receive between them with a close fit a bumper bar such as those indicated at 5 and 6. In thus defining the size or extent of the opening between the arms 15, we have particular reference to a third bar of the bumper, which has not yet been described and which is assumed to be of the identical vertical extent as that of members 5 and 6. The opening should be of at least as great a vertical extent as members 5 and 6 in order conveniently to permit the assembly of these members within the clip. It will be noted that each arm 15 is spaced from the front portion 10 of the clip by a distance approximately equal to the combined thickness of the intermediate portion of bars 5 and 6 and the extremities 16 of such bars.

Each of the rearwardly spaced arms 15 is provided at an intermediate point with a notch or slot 17 just sufficiently large to receive the diameter of the desired size of securing bolt, the head of which will fit within the slot portions 14 of the recess 11.

Not only are the main buffer bars 5 and 6 preferably made of resilient material in the usual manner, but in addition to their inherent resiliency we provide for further resiliency in the bumper as a whole by the use of an additional resilient bar, which in itself comprises a bumper, but which is reversed in its position from the location usually occupied by a bumper member. This reversal of the member from the usual position of a single bar bumper is made possible by the fact that bars 5 and 6 provide all of the effective buffer surface which is necessary, and we are therefore able to reverse bar 20 for the purpose of retaining all of its resilient, flexible characteristics while increasing materially the strength of the bumper as a whole.

It will be noted that the bar 20 is of an elongated C-shape in plan. The manner in which this bar is supported from the frame of a vehicle is immaterial to the present invention and any of the well known types of bumper brackets may be employed for this purpose. The bumper bracket, however, is usually weaker than the remainder of the bumper and is usually the first thing to suffer in the event of a collision or shock. We find that the brackets are materially reenforced by having the intermediate portion 21 of bar 20 extend across between whatever brackets are used. If it were not for this particular feature the bar 20 might be reversed to dispose its intermediate portion 21 within the retaining devices 9 in the place of its end portions 22 which are illustrated as being engaged in such devices.

The vertical extent of bar 20 is chosen with reference to the vertical distance between bars 5 and 6. If, as previously suggested, the bars 5 and 6 are spaced apart for a distance equal to the vertical extent of either of them, then the bar 20 will be of a similarly equal vertical extent, and the spacing between arms 15 of the retaining device 9 will likewise correspond to the vertical extent or height in any of the three resilient members 5, 6, or 20.

It will be noted that the curved outer portions 23 of the resilient supporting bar 20 each extend between the portions 8 of bars 5 and 6. In this way the bar 20 is used as a key to ensure and maintain the proper spacing of bars 5 and 6 and it will obviously be impossible for bars 5 and 6 to move together after the bar 20 has been inserted between their portions 8, as shown in the drawings. It will be noted further that this positioning of the members 5 and 6 is secured without reference to any fastening means such as bolts or the like.

Each extremity 22 of bar 20 is held by a bolt 24 to the center of a plate 25. One of these plates is used in conjunction with each of the clips or retaining devices 9. The plate and the extremity of bar 20 are both apertured to receive the bolt 24 in the manner best shown in Figure 3. Furthermore, from the construction thus far described and from the disclosure in the drawings, it will readily be understood that when the plate 25 is in abutment with the rear surfaces of arms 15 the extremity 22 will lie in between the ends of arms 15 to close entirely the space between such arms. Thereby the clip or retaining device 9 will be positively positioned against vertical movement in either direction with respect to plate 25, and also with respect to the extremity 22 of bar 20.

Each plate 25 is provided with apertures spaced above and below the aperture for bolt 24. The last mentioned apertures are adapted to receive bolts 27, the heads 28 of which are held against rotation by the walls of recess portions 14. These bolts each pass through one of the bars 5 or 6 and hold the end extremities of such bars to the intermediate portions thereof. This is accomplished by turning up the nuts on bolts 27 to draw the intermediate portions of bars 5 and 6 rearwardly and to confine such portions against the extremities 16 of the bars which are in turn confined against the inner surfaces of arms 15. The same bolt serves also to confine plate 25 against the outer surface of arm 15.

While the bolts 27 and 24 are entirely adequate to retain the parts in their desired relative positions, nevertheless, as already pointed out, the arrangement of the bar 20 between bars 5 and 6 and the peculiar form of the clips 9 and the arrangement of the parts therein is such as wholly to relieve the bolts of the necessity of properly spacing the parts. As a consequence, the bolts are subject to no shearing strains whatsoever, and their tensile strength alone is relied upon to maintain the device in assembly.

In our statement of the objects of this invention we have referred to the ease with which the several parts of our improved bumper may be assembled, no bending or springing of the bars being necessary in this operation. The preferred method of assembly is as follows.

The single bars 5, 6, and 20, having previously been bent to the indicated forms, bolts 27 are passed through the proper portions of each of the bars 5 and 6. Thereupon, each such bar is introduced into the interior of the clip 9 through the opening between the arms 15 of the clip. Having been introduced through such opening each bar successively is moved toward its respective end of the clip, the open ended slot 17 receiving the bolt 27 when a bar is so moved. At the same time the recess portion 14 receives the head 28 of each bolt 27 when the bar in which such bolt is mounted is moved to the end of the clip.

The plates 25 are next bolted rigidly by means of the bolt 24 to the extremities 22 of bar 20, and the final operation consists in introducing the extremities 22 of bar 20 between the ends of arms 15, the bolts 27 being simultaneously received through their respective opening in plate 25. The parts are now in their proper relation and are so held by the nuts applied to bolts 27.

It will be seen from the foregoing description of our invention that the specified objects are fully satisfied and that an unusually strong, resilient device has been produced. It will also be recognized by those skilled in the art that this device can be easily and cheaply manufactured, that its parts are inconspicuously held together in a manner productive of an attractive appearance, and that the securing bolts are so relieved of strain as to tend to minimize the possibility of disintegration under the vibration to which devices of this character are subjected.

We claim:

1. In a device of the character described, the combination with a supporting bar, of a retaining clamp having a body portion and mutually spaced arms respectively connected with the ends of the body portion in spaced relation thereto, said supporting bar being receivable between the ends of said arms substantially to close the space therebetween, upper and lower buffer bars having portions disposed respectively between the arms of said clamp and body portion thereof, and a plate bolted to both of said buffer bars and to said supporting bar.

2. In a device of the character described, the combination with a supporting bar, of a retaining clamp having a body portion and mutually spaced arms respectively connected with the ends of the body portion in spaced relation thereto, said supporting bar being receivable between the ends of said arms substantially to close the space therebetween, upper and lower buffer bars having portions disposed respectively between the arms of said clamp and body portion thereof, and a plate bolted to both of said buffer bars and to said supporting bar, the arms of said clamp being interposed between said plate and the upper and lower buffer bars respectively.

3. In a device of the character described, the combination with a supporting bar, of a clamp member having a body portion and a pair of arms connected with said body portion and spaced from each other and from said portion, the ends of said arms substantially abutting said supporting bar above and below it and being provided with bolt receiving apertures, upper and lower bumper members having portions disposed respectively between said arms and said body portion, a plate secured to the rear of said supporting bar and abutting said arms, and bolts securing said plate to each of said arms and each of said upper and lower bumper members.

4. In a device of the character described, the combination with a supporting bar, of a clamp member having a body portion and a pair of arms connected with said body portion and spaced from each other and from said portion, the ends of said arms substantially abutting said supporting bar above and beneath it and being provided with bolt receiving apertures, upper and lower bumper members having portions disposed respectively between said arms and said body portion, a plate secured to the rear of said supporting bar and abutting said arms, and bolts securing said plate to each of said arms and each of said upper and lower bumper members, said body portion being provided with recesses adapted to permit of the introduction and sliding movement of the heads of said bolts while securing said heads against rotation and in a concealed position.

5. In a device of the character described, the combination with a supporting bar, of a retaining clamp having a body portion, arms spaced from the body and having their ends normally spaced, said supporting bar being fitted between and engaging the ends of said arms to close the space therebetween, upper and lower buffer bars engageable with the arms, and a plate bolted to both of said buffer bars and to said supporting bar.

PAUL P. RUNNELS.
FRED WILLIAMSON.